June 28, 1960      G. A. LYON      2,942,339
BOMB HEAD CONSTRUCTION AND METHOD OF MAKING SAME
Filed March 28, 1955
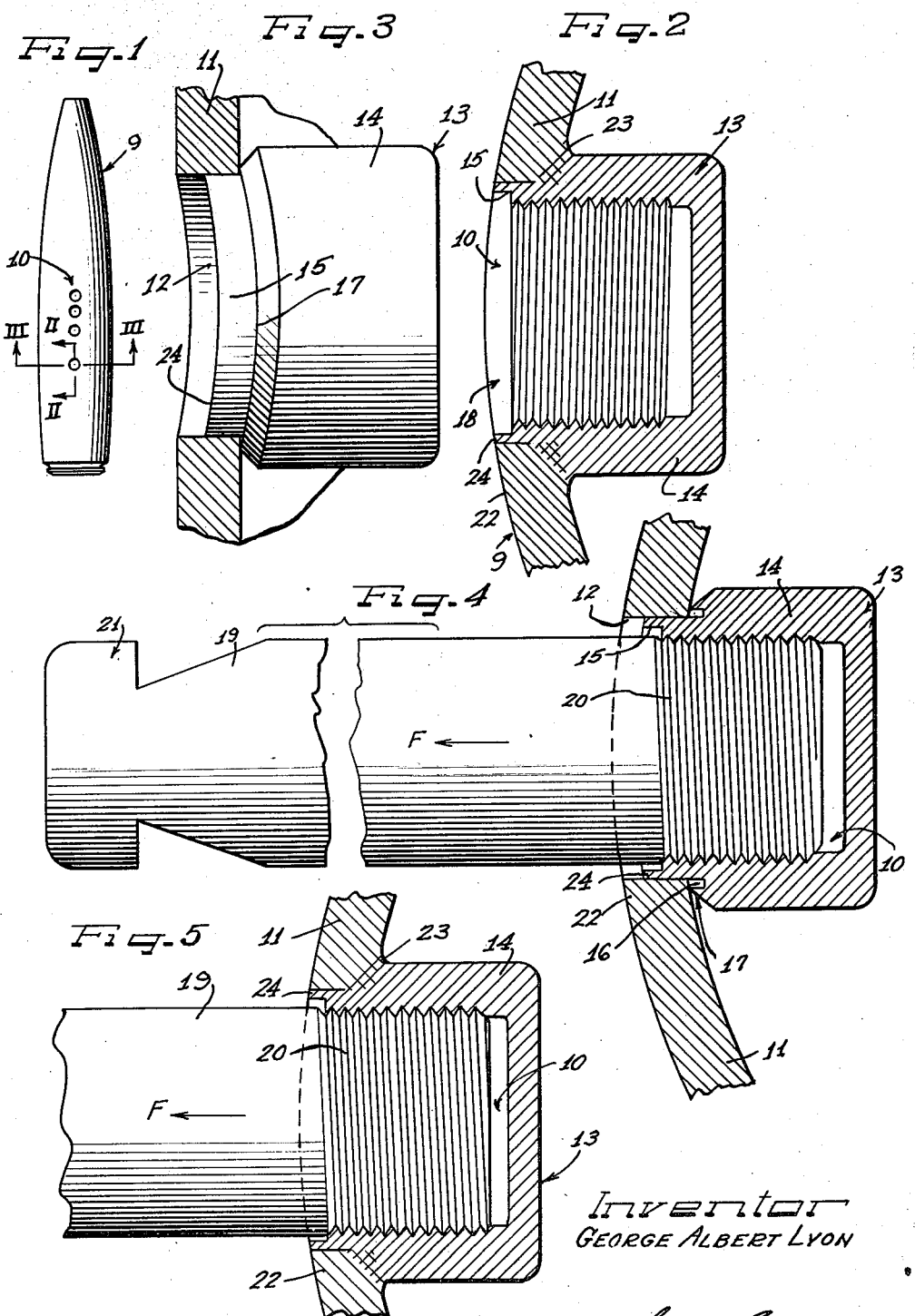
Inventor
GEORGE ALBERT LYON United States Patent Office 2,942,339
Patented June 28, 1960

2,942,339

BOMB HEAD CONSTRUCTION AND METHOD OF MAKING SAME

George Albert Lyon, 13881 W. Chicago Blvd., Detroit, Mich.

Filed Mar. 28, 1955, Ser. No. 497,267

6 Claims. (Cl. 29—468)

This invention relates generally to a bomb stud construction and also to a method and apparatus for providing suspension means in order to carry the bomb on the underside of an air vehicle.

Bomb manufacturers are today directing their attention towards the problem of simply and economically securing hanger sockets to the wall of the bomb casing at the approximate center of mass of the bomb which are capable of receiving hanger elements. One of the requirements which must be met is the provision of an effective seal between the junction of the socket and the wall of the bomb casing so as to preclude moisture from entering through any crevasses and in this manner dampening and rendering the powder charge ineffective.

Accordingly, it is an object of this invention to provide a simple and economical method of attaching hanger sockets to the wall of the bomb.

Another object of this invention is in the provision of a simple apparatus which aids in the accomplishment of this end.

Still another object of this invention relates to the attachment of a stud socket to the cylindrical bomb wall thereby effecting a good seal which resists propensities of moisture to seep into the interior of the bomb.

A further object of this invention relates to a novel method for attaching stud hanger sockets to the wall of the bomb casing so that will be concentric with the outer streamlined surface of the bomb.

A still further object of this invention is to provide a novel metal socket construction for attachment to the inner cylindrical surface of a metal wall and which lends itself for attachment to the metal bomb wall by projection welding with a minimum of flash.

In accordance with the general features of this invention there is provided in a method of attaching a stud having a shank and an irregularly configurated shouldered head to the cylindrical wall of a bomb, the steps of forming an opening in the cylindrical wall of the bomb, telescoping the shank portion in the opening and nesting the irregularly configurated shouldered head against the inner surface of the cylindrical wall and exerting heavy forces upon the stud thereby welding the shouldered head of the stud to the cylindrical wall of the bomb.

Among other features of the present invention, there is provided in a hanger socket for attachment to the cylindrical wall of a bomb, an apertured cylindrical wall and a stud including a head in shouldered engagement with an inner surface of the wall and having a shank extending through the aperture, the stud having an internal socket to receive detachably therein a hanger element, the shouldered head corresponding generally to the cross section of the cylindrical wall to nest snugly against the inner cylindrical surface of the wall to minimize flush incident to the welding of the stud to the cylindrical wall.

Other objects and features of this invention may more fully appear from the following detailed description taken in conjunction with the accompanying drawing which illustrates a single embodiment thereof and in which:

Figure 1 is a side view of a bomb having a series of hanger sockets for suspending the bomb from the underside of an airplane or the like;

Figure 2 is an enlarged fragmentary cross sectional view, taken generally on the line II—II of Figure 1 looking in the direction of the arrows, of my novel bomb hanger socket in a completed state ready for use with a bomb hanger;

Figure 3 is an enlarged fragmentary cross sectional view of the bomb wall on the line III—III of Figure 1 looking in the direction of the arrows prior to the joining of the stud socket to the wall of the bomb;

Figure 4 is an enlarged fragmentary cross sectional view illustrating how my novel apparatus is utilized to interlock the hanger socket with the wall of the bomb; and Figure 5 is an enlarged fragmentary cross sectional view illustrating one of the steps of my novel method with the arrow indicating the direction of force which has just been applied, and showing the socket interlocked with the wall of the bomb prior to the removal of the apparatus.

As shown on the drawings:

The numeral 9 indicates generally a tubular bomb shell casing (Figure 1) with my novel completed sockets indicated generally at 10 (Figures 1 and 2) where they have been formed and carried by the cylindrical wall 11 of the bomb casing 9. While my method is illustrated in connection with a uni-sectional casing it will be appreciated that a multi-sectional casing could be used without departing from my invention. It will, of course, be understood that after the sockets have been completed that the casing 9 will then be in condition for assembly with its other ecomponent parts (not shown) including, a tail assembly, the powder charge, and the detonator assembly.

It is believed that my novel method and apparatus for attaching bomb hanger sockets to the wall of the bomb casing will be best understood from a detailed description taken in connection with the steps in my method of manufacture.

The first step of my method in the construction of the instant streamlined low drag bomb casing 9 is the drawing and forming of the generally tubular bomb casing 9 from rolled steel plate such as low carbon steel or the like. It will be appreciated that this may be effected in any suitable manner.

The next step of my novel method is in the formation of an aperture 12 (Figure 4) in the wall 11 of the casing 9. The aperture is of a circular configuration and is preferably formed in a punch type operation.

The next step in my method of construction is in the formation of a socket 10 in a stud 13 of a predetermined configuration in order to facilitate interlocking of the stud with the wall 11 immediately about the aperture 12. As is best seen in Figure 4 it will be noted that the stud 13 includes an annular headed portion 14 and an annular shank 15 of smaller cross section. At the junction of the shank 15 with the headed portion 14 there is preferably formed therein a notch 16 which facilitates the formation of an annular irregularly configurated peaked edge or shoulder 17 which is utilized in a manner hereinafter described in connection with the projection welding operation. The notch 16, if employed, has the added advantage of minimizing flash in the welding operation.

The edge 17 is preferably of an irregular predetermined configuration which is based as a general proposition upon the curvature of the cylindrical shape of wall 11 to which the edge 17 is to be integrated with.

In determining the curvature to be imparted to edge 17 it will be noted that the longitudinal and transverse curvature of the cylindrical metal wall 11 varies, the contrast being best illustrated in Figures 3 and 4. In other words, the angles of declination of the longitudinal and transverse curvatures are not the same.

Previously the curvature of the edge 17 has not been so formed as to compensate for both longitudinal and transverse variations in the angles of declination. It is in this manner that the edge 17 closely approximates in configuration the irregular shape of the surface to which the peak is to be welded.

After the preforming of the stud 13 the stud is drilled and tapped as indicated generally at 18 in Figure 2.

In the assembly and attachment of the stud to the bomb wall 12, a draw bar apparatus 19 having one of its ends threaded generally at 20 and the other end headed, as indicated generally at 21, is employed as hereafter described. The threaded end 20 of the draw bar 19 is threaded into the socket 10 so as to effect a tight fit. Thereafter the draw bar 19 is telescoped from inside of the bomb casing 9 and pulled radially outward in the direction indicated by the directional arrow F on the draw bar 19 as shown on Figures 4 and 5.

The wall 11 adjacent the aperture 12 and the stud 13 has been preferably preheated before assembly for the drawing operation which will follow or is now heated. The heating of wall 11 and stud 13 may be effected by the use of electrodes or other suitable apparatus. Actually the draw bar 19 can be utilized as one electrode to apply welding energy. The other electrode (not shown) being engaged on the inner side of the bomb casing with stud 13.

It will be appreciated that during the pulling and welding operation the bomb wall can be suitably clamped or held in place.

The headed end 21 of the draw bar 19 is then interlocked with a suitable drawing apparatus (not shown) which is capable of exerting considerable forces. Good results have been obtained in the joining of the wall 11 to the stud 13 through the application of forces in the vicinity of 20,000 lbs.

As the draw bar 19 is urged radially outwardly the nested annular edge or shoulder 17 is preferably projection welded into the radially inner surface of the wall 12 to integrate the respective metal surfaces. It will be noted in Figure 5 that a portion of the metal flows to form an annular fillet 23 which further aids the seal. After the surfaces have been interlocked by means of the projection welding operation, the draw bar 19 is threadingly removed from the socket 10.

It should be noted that the annular radial extremity 24 of shank portion 15 of stud 13 is drawn into concentric alignment with the radially outer cylindrical surface 22 of wall 11. This is facilitated by reason that the annular radial extremity 24 of shank portion 15 is preferably irregularly configurated in a predetermined manner so as to compensate for longitudinal and transverse variations in the angles of declination of the radially outer surface 22 of wall 11 in the same manner as previously described in connection with the edge 17.

While the steps of my novel method have been described generally in chronological order, it will be appreciated that certain of the steps may be interchanged without departing from the instant invention.

It will be understood that modifications and variations may be effected without departing from the spirit and scope of the novel concepts of the present invention.

I claim as my invention:

1. In a method of attaching a cup-shaped hanger socket to a cylindrical wall of a bomb wall, the steps of forming an opening in said wall, forming a threaded cup-shaped stud socket including a shank and a headed portion with the terminal end of said shank and headed portion irregularly formed so as to approximate closely the sloping cylindrical configuration of the wall, inserting from inside the cylindrical wall said shank in said opening, securing and sealing in moisture-proof relation said irregularly formed headed portion of the stud to the inner surface of the cylindrical wall while concentrically aligning the irregularly formed terminal end of the shank with the cylindrical outer surface of the wall by welding and by applying heavy pressure from the external side of the bomb wall thereby moving the shank and headed portion outwardly and transversely of the wall embedding the irregularly formed headed portion in the bomb wall in moisture sealed assembly therewith.

2. In a method of providing suspension means on the wall of the tubular bomb casing for cooperation with a hanger element comprising an internally threaded stud and with the casing having at least one open end, the steps of cutting an opening intermediate the ends of and through the bomb casing wall, inserting the stud internally of the casing and extending the threaded end of a draw bar through the opening and turning the draw bar into threaded assembly with the stud and bottoming and nesting the headed end of the stud against the curved inner wall surface, applying heavy forces to the draw bar externally of the bomb casing in a direction away from the casing wall to weld the headed stud to the casing wall about the opening in moisture sealed relation, and disengaging the draw bar from the stud.

3. In a method of attaching a threaded cup-shaped hanger socket to an inner cylindrical wall of a bomb, the steps of forming an opening in the cylindrical wall of the bomb, threading a draw bar into the open end of the cup-shaped threaded hanger socket and headed stud, telescoping the draw bar through said opening, heating the engaged surfaces of the stud and wall adjacent the areas to be joined, and applying heavy forces to an end of the draw bar disposed externally of the wall in a radially outwardly extending direction with respect to the bomb wall thereby welding the headed stud in moisture proof assembly with the wall of the bomb.

4. In a method of attaching a threaded cup-shaped hanger socket to a cylindrical wall of a bomb, the steps of forming an opening in the cylindrical wall of the bomb, threading a draw bar into a threaded open end of the cup-shaped threaded hanger socket of a headed stud, telescoping the draw bar through said opening, heating the engaged surfaces of the stud and wall adjacent the areas to be joined, applying heavy forces to an end of the draw bar disposed externally of the wall in a radially outer direction with respect to the bomb wall thereby welding the headed socket in moisture proof assembly with the wall of the bomb, and removing the draw bar by unthreading same from the threaded socket.

5. In a method of attaching a stud having a shank and an irregularly configurated shouldered head to the tubular cylindrical wall of a bomb, the steps of forming an opening in the cylindrical wall of the bomb, telescoping the shank portion through one of the open ends of the tubular wall into the opening and nesting the irregularly configurated shoulder head against the inner surface of the cylindrical wall, and welding the stud to the wall including the step of exerting radially outwardly heavy pulling forces from the outer side of the wall upon the stud in a direction away from the wall thereby welding the shouldered head of the stud in moisture sealed relation to the cylindrical wall of the bomb.

6. In a method of providing suspension means on the wall of a tubular bomb casing for cooperation with a hanger element comprising a headed stud having a shank and with the casing having at least one open end, the steps of cutting an opening intermediate the ends of and through the bomb casing wall, turning a draw bar into assembly with a headed stud and inserting the assembly through the open end of the casing and directing the shank of the stud through the casing wall so that the headed portion of the stud nests against the curved inner wall surface, welding the stud to the wall by applying heavy forces to the draw bar externally of the casing in a direction away from the casing wall to weld the headed stud to the casing wall about the opening in moisture sealed relation and disengaging the draw bar from the stud.

References Cited in the file of this patent

UNITED STATES PATENTS

| | | |
|---|---|---|
| 1,034,805 | Lachman | Aug. 6, 1912 |
| 1,887,448 | Behringer | Nov. 8, 1932 |
| 2,017,261 | Soden | Oct. 15, 1935 |
| 2,054,187 | Almdale | Sept. 15, 1936 |
| 2,167,285 | Smith | July 25, 1939 |
| 2,202,405 | Smith | May 28, 1940 |
| 2,226,496 | Jacocks | Dec. 24, 1940 |
| 2,384,324 | Martin | Sept. 4, 1945 |

FOREIGN PATENTS

| | | |
|---|---|---|
| 153,439 | Australia | Sept. 29, 1953 |